(12) United States Patent
Kalezade et al.

(10) Patent No.: US 11,366,007 B2
(45) Date of Patent: Jun. 21, 2022

(54) SYSTEM FOR ASSOCIATING BAGGAGE WEIGHT DATA TO PASSENGER INFORMATION AUTOMATICALLY

(71) Applicant: TURK HAVA YOLLARI ANONIM ORTAKLIGI, Istanbul (TR)

(72) Inventors: Kadirli Baskan Kalezade, Istanbul (TR); Yunus Kizilay, Istanbul (TR); Emirhan Sancak, Istanbul (TR); Serdar Gurbuz, Istanbul (TR); Oguzhan Aydin, Istanbul (TR)

(73) Assignee: TURK HAVA YOLLARI ANONIM ORTAKLIGI, Istanbul (TR)

( * ) Notice: Subject to any disclaimer, the term of this patent is extended or adjusted under 35 U.S.C. 154(b) by 505 days.

(21) Appl. No.: 16/498,001

(22) PCT Filed: Mar. 28, 2018

(86) PCT No.: PCT/TR2018/050125
§ 371 (c)(1),
(2) Date: Sep. 26, 2019

(87) PCT Pub. No.: WO2019/070210
PCT Pub. Date: Apr. 11, 2019

(65) Prior Publication Data
US 2020/0025606 A1    Jan. 23, 2020

(30) Foreign Application Priority Data
Mar. 30, 2017 (TR) .................................. 2017/04771

(51) Int. Cl.
*G01G 19/415* (2006.01)
*G01G 23/37* (2006.01)
(Continued)

(52) U.S. Cl.
CPC ........... *G01G 19/415* (2013.01); *G01G 19/62* (2013.01); *G01G 23/3735* (2013.01); *G06Q 30/0283* (2013.01)

(58) Field of Classification Search
CPC .. G01G 19/415; G01G 19/62; G01G 23/3735; G06Q 30/0283
See application file for complete search history.

(56) References Cited

U.S. PATENT DOCUMENTS 2,490,131 A * 12/1949 Horst ..................... G01G 23/00
177/144
6,407,348 B1 * 6/2002 Scott ....................... B65G 21/10
14/71.3
(Continued)

FOREIGN PATENT DOCUMENTS

| CN | 202600813 U | 12/2012 |
|---|---|---|
| DE | 10 2014 106 448 A1 | 11/2015 |
| JP | 2008233961 A | 10/2008 |

OTHER PUBLICATIONS

Computer translation of JP 2008-233961 downloaded from the JPO website downloaded Jun. 22, 2021.*
(Continued)

*Primary Examiner* — Randy W Gibson
(74) *Attorney, Agent, or Firm* — Ladas & Parry LLP

(57) ABSTRACT

The present invention relates to a system for associating baggage weight data to passenger information automatically by integrating scales weighing passenger baggage at airports to check-in application. The inventive system comprises counter device, scale, integration device, data terminal hardware, wireless network module, data tracking module and server.

13 Claims, 1 Drawing Sheet

(51) Int. Cl.
*G06Q 30/02* (2012.01)
*G01G 19/62* (2006.01)

(56) References Cited

U.S. PATENT DOCUMENTS

| | | | | |
|---|---|---|---|---|
| 9,518,861 B2* | 12/2016 | Aumente | ............... | G07B 15/00 |
| 2007/0046426 A1* | 3/2007 | Ishibashi | ............... | G07C 9/257 |
| | | | | 340/5.82 |
| 2013/0043079 A1* | 2/2013 | Levin | ..................... | G01G 19/58 |
| | | | | 177/1 |
| 2013/0211864 A1* | 8/2013 | Sanderson | .............. | B64F 1/366 |
| | | | | 705/5 |
| 2015/0096813 A1 | 4/2015 | Aumente | | |

OTHER PUBLICATIONS

ISR for International Application No. PCT/TR2018/050125.
Written Opinion for International Application No. PCT/TR2018/050125.
JP 2008233961 A—Espacenet English Abstract.
CN 202600813 U—Espacenet English Abstract.
DE 10 2014 106 448 A1—Espacenet English Abstract.

* cited by examiner

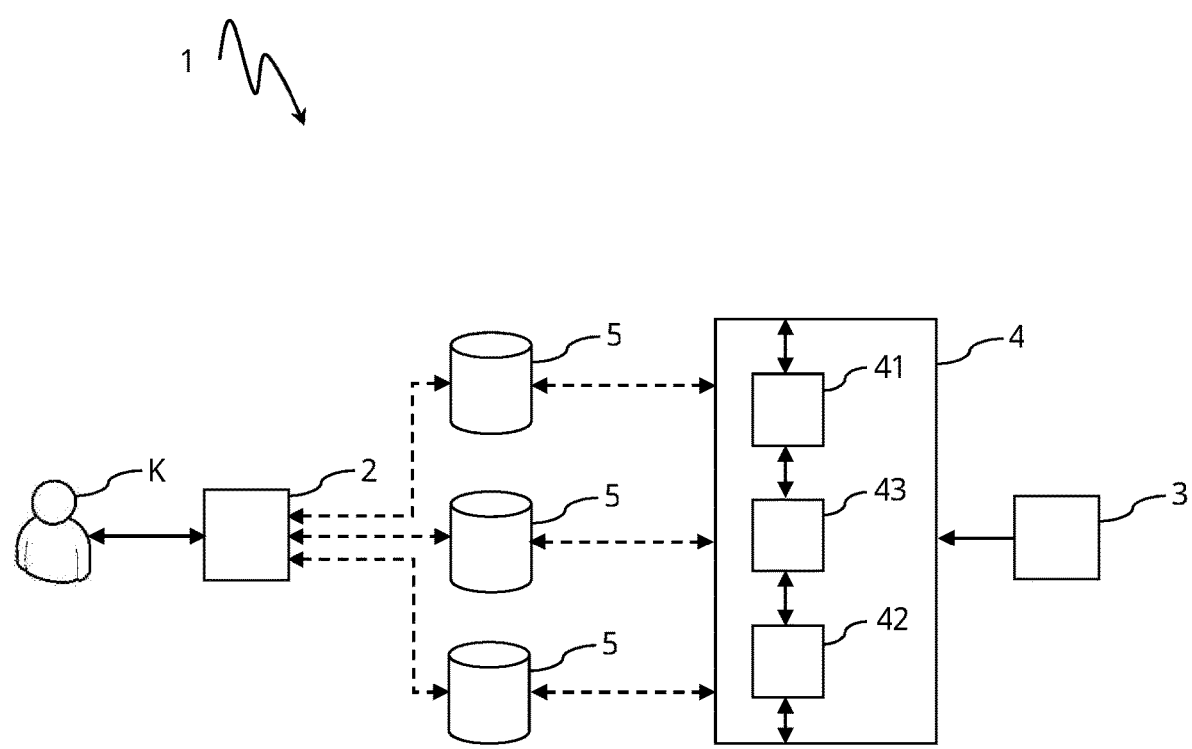

SYSTEM FOR ASSOCIATING BAGGAGE WEIGHT DATA TO PASSENGER INFORMATION AUTOMATICALLY

RELATED APPLICATION

This application is an application under 35 U.S.C. 371 of International Application No. PCT/TR2018/050125 filed on 28 Mar. 2018, which claims priority from Turkish Applications No. 2017/04771 filed 30 Mar. 2017, the disclosures of which are incorporated in their entirety by reference herein.

TECHNICAL FIELD

The present invention relates to a system for associating baggage weight data to passenger information automatically by integrating digital scales weighing passenger baggage at airports to check-in application.

BACKGROUND OF THE INVENTION

Today, there are common counters wherein passengers check-in is carried out at airports. A personnel appointed by airport companies performs passengers' check-in by means of a device such as computer located in these counters. Besides, in the event that passengers have baggage, baggage weight is weighed by means of a scale and check-in is carried out trough a counter attendant by associating baggage weight information to passenger.

Due to the fact that baggage weight is limited for each passenger, passengers are charged for extra weight and more importantly, because of importance of baggage and passenger weights on plane the fact that a personnel inputs baggage weight to a counter device manually leads to a status for which measure should be taken considering errors that may result from human factor. In addition to this, due to the fact that passengers are charged extra in the event that baggage weight exceeds a certain limit as mentioned above airline companies suffer financial losses due to errors that may result from human factor again.

In addition to the above-mentioned matters, it takes time for an attendant to input weight data displayed by baggage scale into counter device. Given passenger density at airports, this loss of time causes decrease in quality of service provided to passengers.

Because of these reasons, a system for enabling to perform baggage control faster at airports and preventing errors resulting from human factor is needed.

The Chinese patent document no. CN202600813, an application in the state of the art, discloses a self-service check-in system wherein currently used artificial check-in systems and artificial luggage checking systems are adapted and integrated to one another.

The German patent document no. DE 102014106448, another application in the state of the art discloses a common baggage control method which establishes communication between tags assigned to baggage in baggage control unit and ticket control systems of airline companies of passengers and transmits baggage data to ticket control system.

SUMMARY OF THE INVENTION

An objective of the present invention is to realize a system for enabling to transmit weight data weighed by passenger baggage scales to check-in units automatically at airports.

Another objective of the present invention is to realize a system for providing integration to current digital scales and current check-in applications.

A further objective of the present invention is to realize a system for performing baggage control faster and preventing errors resulting from human factor at airports.

DETAILED DESCRIPTION OF THE INVENTION

System for Associating Baggage Weight Data to Passenger Information Automatically realized to fulfil the objectives of the present invention is shown in the FIGURE attached, in which:

FIG. 1 is a schematic block diagram of the inventive system.

The components illustrated in the FIGURE are individually numbered where the numbers refer to the following:
1. System
2. Counter device
3. Scale
4. Integration device
   41. Data terminal hardware
   42. Wireless network module
   43. Data tracking module
5. Server
K: Counter Attendant The Inventive system (1) for associating baggage weight data to passenger information automatically at airports comprises:
   at least one counter device (2) with which the counter attendant (K) interacts and which comprises a suitable interface whereby the counter attendant (K) can create input for passenger ticket and baggage transactions
   at least one scale (3) which can determine weight of objects that are placed to a certain area thereof by means of sensors included in thereof and can make data transfer
   at least one integration device (4) which comprises data terminal hardware (41) that receives weight data from the scale (3) over a socket, wireless network module (42) that performs transmission of the received weight data to related units over a data network wirelessly and data tracking module (43) that tracks whether data flow on the data terminal hardware (41) and the wireless network module (42) occurs without any problem or not;
   at least one server (5) which initiates session in accordance with the ticket information that it receives from the counter device (2), receives the weight information from the wireless network module (42) contained by the integration device (4) within the session, applies certain filters to the weight information and associates the weight information that it has determined as a result of the filters to the ticket information (FIG. 1).

The counter device (2) included in the inventive system (1) is a unit whereby a counter attendant (K) authorized by the airline company determines preferences for passenger's ticket and baggage transactions as input by interacting with it. The counter device (2) comprises a suitable interface enabling the counter attendant (K) to input ticket information of passengers and transmits the received ticket information to the server (5). The ticket information input by the counter attendant (K) are information such as ticket number, passenger identification information. The counter device (2) runs an application enabling to display the data that are transmitted by the server (5) in accordance with the preferences of the counter attendant (K) transmitted to the server (5), to the counter attendant (K) by a suitable interface.

The scale (3) included in the inventive system (1) is a unit which weighs objects that are placed on thereof and that are baggage of a passenger such as preferably luggage. The scale (3) has a platform for placing objects requested to be weighed. When a passenger baggage is placed on the platform of the scale (3), the scale (3) determines the baggage weight information by means of sensors contained by thereof. The scale (3) determines the baggage weight information in a digitized digital format or it can convert the weight data determined as analog signal into digital format. The scale (3) comprises a data terminal which provides serial transmission in order to carry out transmission of the digital data determined. In one embodiment of the invention, the scale (3) uses RS-232 standards for data transmission over data terminal.

In one embodiment of the invention, the scale (3) comprises a wireless data terminal which provides wireless transmission in order to carry out transmission of the digital data determined.

The integration device (4) included in the inventive system (1) is a unit which can be mounted to the scales (3) whereby baggage weights of passengers are determined. Data about passenger baggage weight are received by the integration device (4) from the scale (3) over the connection established among the data terminals of the scale (3). The integration device (4) controls data flow by means of the data tracking module (43) contained by thereof.

The data terminal hardware (41) Included Inside the integration device (4) is a unit which receives the weight data transmitted by the scale (3). The data terminal hardware (41) establishes connection with the scale (3) over a socket using a certain protocol. The data terminal hardware (41) receives the weight data from the scale (3) at a data flow rate determined in the connection protocol. The data terminal hardware (41) transmits the received weight data to the data tracking module (43). In an embodiment of the scale (3) wherein it comprises wireless data terminal, the data terminal hardware (41) is configured such that it can receive the weight data determined by the scale (3) by means of wireless connection.

The wireless network module (42) included inside the integration device (4) is a unit which establishes communication with the server (5) on a data network. The wireless network module (42) converts the digital data transmitted by the data tracking module (43) Into a suitable signal format and transmits them to the server (5). In one embodiment of the invention, the wireless network module (42) is in communication with a plurality of servers (5) over local network. The wireless network module (42) has a unique definition information enabling it to be distinguished on the network whereto it is connected.
that performs transmission of the received weight data to related units over a data network wirelessly and that tracks whether data flow on the data terminal hardware (41) and the wireless network module (42) occurs without any problem or not.

The data tracking module (43) included inside the integration device (4) is a unit which performs flow control of the data received from the scale (3). In one embodiment of the invention, the data tracking module (43) filters the weight data transmitted by the data terminal hardware (41) and transmits the filtered data to the wireless network module (42). In the filtering transaction, the data tracking module (43) analyses change of the weight data transmitted continuously and repeats them in accordance with certain definitions or eliminates faulty data that don't comply with the data flow. The data tracking module (43) automatically restarts the integration device (4) in accordance with certain default settings in the event that it cannot receive data from the data terminal hardware (41) at a level suitable for the certain definitions comprised and/or it cannot transmit data to the wireless network module (42).

The sever (5) included in the inventive system (1) is a unit which is in communication with the counter device (2) and the integration device (4). The server (5) receives the ticket information, that is input by the counter attendant (K) by means of the interface contained by the counter device (2), over a data network. Upon receiving the ticket information, the server (5) Initiates a session in accordance with the ticket information. In preferred embodiment of the invention, the server (5) records ticket information of tickets sold to an airline company. After initiating session, the server (5) receives the weight data from the wireless network module (42). The server (5) applies filters to the weight data in accordance with the definitions contained by thereof in order to create a meaningful weight information from the weight data received. The server (5) associates the meaningful weight information received to the ticket information within the session initiated.

In one embodiment of the invention, the server (5) records the weight information that it associates to the ticket information, calculates amount of extra charging in accordance with the definitions comprised by thereof if there is excess of weight limit and transmits the extra charging information to the counter device (2) together with the weight information.

In another embodiment of the invention, the server (5) transmits the weight information associated to the ticket information by thereof to the counter device (2), receives the approval preference of weight information created by the counter attendant (K) by means of the counter device (2) and in the event that the approval preference of the counter attendant (K) is positive, records the weight information, calculates amount of extra charging in accordance with the definitions comprised by thereof if there is excess of weight limit and transmits the extra charging information to the counter device (2) together with the weight information.

With the inventive system (1), integration of data weights received from baggage scales at airports to check-in applications is carried out automatically. In the said system (1), integration device (4) which can be mounted to baggage scales transfers weight data that it receives from the scales (3) to the servers (5) comprising ticket records of airline company over a data network. The server (5) includes the received approval information to passenger's ticket information by submitting them for the counter attendant's (K) approval or automatically and determines amount of extra charging and transmits it to the counter device (2) in case of excess of weight limit. In the inventive system (1), there is a device that can be mounted to digital scales by means of a data communication link and it is enabled to determine information of baggage weight automatically without intervening software comprised by the counter devices (2) that are being used by different airline companies. Thus, errors occurring due to manual data input in counters are avoided and transactions of baggage control are fastened.

It is possible to develop various embodiments of the inventive system (1), the invention cannot be limited to examples disclosed herein and it is essentially according to claims.

The invention claimed is:

1. A system (1) for enabling integration of passenger baggage scale to check-in applications at airports; comprising:
    at least one counter device (2) with which the counter attendant (K) interacts and which comprises a suitable interface whereby the counter attendant (K) can create input for passenger ticket and baggage transactions;
    at least one scale (3) which can determine weight of objects that are placed to a certain area thereof by means of sensors included in thereof and can make data transfer;
and characterized by:
    at least one integration device (4) which comprises data terminal hardware (41) that receives weight data from the scale (3) over a socket, wireless network module (42) that performs transmission of the received weight data to related units over a data network wirelessly and data tracking module (43) that tracks whether data flow on the data terminal hardware (41) and the wireless network module (42) occurs without any problem or not;
    at least one server (5) which initiates session in accordance with the ticket information that it receives from the counter device (2), receives the weight information from the wireless network module (42) contained by the integration device (4) within the session, applies certain filters to the weight information and associates the weight information that it has determined as a result of the filters to the ticket information.

2. A system (1) according to claim 1; characterized by the counter device (2) which comprises a suitable interface enabling the counter attendant (K) to input ticket information of passengers and transmits the received ticket information to the server (5).

3. A system (1) according to claim 2; characterized by the counter device (2) which runs an application enabling to display the data, that are transmitted by the server (5) in accordance with the preferences of the counter attendant (K) transmitted to the server (5), to the counter attendant (K) by a suitable interface.

4. A system (1) according to claim 3; characterized by the scale (3) which comprises a data terminal for providing serial transmission in order to carry out transmission of the digital data determined.

5. A system (1) according to claim 4; characterized by the scale (3) which comprises a data terminal for providing wireless transmission in order to carry out transmission of the digital data determined.

6. A system (1) according to claim 4; characterized by the integration device (4) which comprises the data terminal hardware (41) that establishes connection with the scale (3) over a socket using a certain protocol and transmits the received weight data to the data tracking module (43).

7. A system (1) according to claim 5; characterized by the integration device (4) which comprises the data terminal hardware (41) that is configured such that it can receive the weight data determined by the scale (3) by means of wireless connection.

8. A system (1) according to claim 6; characterized by the integration device (4) which comprises the data tracking module (43) that analyses change of the weight data transmitted continuously by the data terminal hardware (41) and repeats them in accordance with certain definitions or performs filtering by eliminating faulty data that don't comply with the data flow and transmits the filtered data to the wireless network module (42).

9. A system (1) according to claim 8; characterized by the integration device (4) which comprises the data tracking module (43) that automatically restarts the integration device (4) in accordance with certain default settings in the event that it cannot receive data from the data terminal hardware (41) at a level suitable for the certain definitions comprised and/or it cannot transmit data to the wireless network module (42).

10. A system (1) according to claim 9; characterized by the server (5) which records ticket information of tickets sold to an airline company.

11. A system (1) according to claim 10; characterized by the server (5) which applies filters to the weight data in accordance with the definitions contained by thereof in order to create a meaningful weight information from the weight data that it receives from the wireless network module (42) and associates the meaningful weight information determined by thereof to the ticket information within the session initiated by thereof.

12. A system (1) according to claim 11; characterized by the server (5) which records the weight information that A associates to the ticket information, calculates amount of extra charging in accordance with the definitions comprised by thereof if there is excess of weight limit and transmits the extra charging information to the counter device (2) together with the weight information.

13. A system (1) according to claim 11; characterized by the server (5) which transmits the weigh information associated to the ticket information by thereof to the counter device (2), receives the approval preference of weight information created by the counter attendant (K) by means of the counter device (2) and in the event that the approval preference of the counter attendant (K) is positive, records the weight information, calculates amount of extra charging in accordance with the definitions comprised by thereof if there is excess of weight limit and transmits the extra charging information to the counter device (2) together with the weight information.

* * * * *